United States Patent Office 3,403,972
Patented Oct. 1, 1968

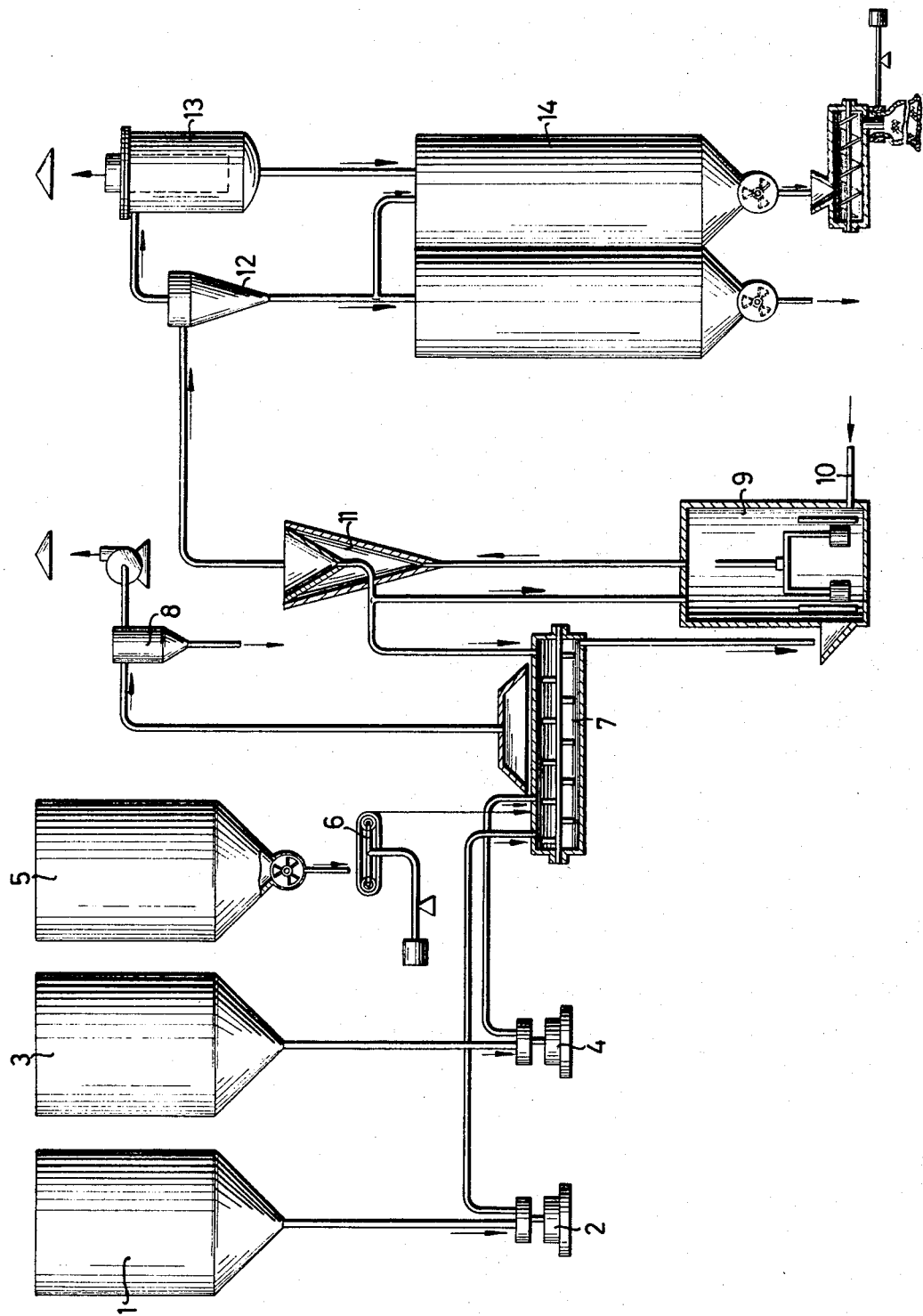

3,403,972
PROCESS AND APPARATUS FOR A SALT MIXTURE FORMED OF SODIUM, MAGNESIUM AND OPTIONALLY CALCIUM ORTHOPHOSPHATES
Heinz Harnisch, Lovenich, near Cologne, Joseph Cremer, Hermulheim, near Cologne, and Arnulf Hinz, Knapsack, near Cologne, Germany, assignors to Knapsack Aktiengesellschaft, Knapsack, near Cologne, Germany, a corporation of Germany
Filed Jan. 13, 1966, Ser. No. 520,401
Claims priority, application Germany, Jan. 29, 1965, K 55,138
18 Claims. (Cl. 23—107)

ABSTRACT OF THE DISCLOSURE

A salt mixture formed of sodium, magnesium and optionally calcium orthophosphates and process for making same, said salt mixture being useful as an animal feed additive.

---

Salt mixtures formed of sodium, magnesium and optionally calcium orthophosphates are primarily used as animal feed additives. It is known that salt mixtures of this type can be prepared by intermixing the phosphates produced separately. However, this is an unattractive procedure which requires a plurality of single process steps.

It is also known that finely ground limestone, if desired in admixture with ground dolomite, can be reacted with stoichiometric proportions of a 84–85% orthophosphoric acid to give dicalcium phosphate, if desired in admixture with magnesium phosphate, while avoiding the formation of an aqueous phase.

When phosphoric acid containing $H_3PO_4$ in a concentration of 75–84% is used, a proportion of quicklime or anhydrous sodium pyrophosphate sufficient to bind or evaporate excessive water is added to the limestone or limestone/dolomite mixture. In this case, the starting products are preferably mixed on a plate mixer. The addition of pyrophosphate results in more than an insignificant increase in price and optionally physiologically affects the polyphosphate.

This process has the disadvantage that the sodium pyrophosphate used is prepared separately and isolated first and the reaction product subjected to a prolonged ripening procedure subsequently.

It has now unexpectedly been found that a salt mixture formed of sodium, magnesium and optionally calcium orthophosphates, especially suitable for use as animal feed additive, can be prepared in simple manner in a single step by a process, wherein orthophosphoric acid, sodium hydroxide solution and/or sodium phosphate solutions or mixtures of sodium orthophosphate and orthophosphoric acid, as well as magnesium oxide, optionally in admixture with calcium oxide as the starting products are reacted with each other with permanent agitation and mixing for a period of 10–45 minutes. In accordance with the present invention the orthophosphoric acid used contains 45–60% by weight, preferably 50–55% by weight $P_2O_5$, and the magnesium and optionally the calcium oxides have a grain size small than 0.5 mm., preferably smaller than 0.1 mm. After evaporation of the bulk of the water of adhesion by means of heat of neutralization set free, the salt mixture obtained is freed from residual water of adhesion by drying and, if desired, by comminuting it simultaneously.

The exothermal reaction is carried out at a temperature of 80–120° C., preferably at about 100° C., with about 20–50% of the water introduced through the phosphoric acid, the sodium hydroxide solution or the sodium phosphate solution being evaporated.

The salt mixture obtained is most conveniently freed from the residual water of adhesion by mill-drying. To this end, the salt mixture with a total water content of about 35% by weight is admixed with a proportion of recycled material, preferably oversize grains coming from the mill-drying stage sufficient to reduce the total water content of the salt mixture to 25% by weight before mill-drying it. Recycling the oversize grains to the mixer does not mean diminished mill capacity as cycling the oversize would anyway be a necessary feature.

The MgO-CaO-mixture used as the starting product can be replaced with calcined, preferably with annealed dolomite or with a mixture of $Mg(OH)_2$ and $Ca(OH)_2$, and the sodium phosphate solution can be replaced with orthophosphoric acid partially neutralized with a proportion of sodium hydroxide solution and/or sodium carbonate sufficient to obtain a final product with a predetermined content of sodium.

The sodium orthophosphate/orthophosphoric acid mixture should preferably contain 33–43% by weight, advantageously 36–40% by weight, of $P_2O_5$ and should contain $Na_2O$ and $P_2O_5$ in a ratio by weight of 1:2 to 1:3, advantageously 1:2.5.

It has proved especially advantageous to cause the starting components, while they are being mixed, to travel through a mixing range and to feed the starting components concurrently to that mixing range, liquid starting components being preferably fed near the opening portion of that range and solid starting components being fed at a place immediately thereafter.

The apparatus for carrying out the process of the present invention comprises a continuous mixer with self-cleaning mixing means, and a mill-drying means connected to a wind-sifting device which is designed to enable oversize grains separated in the wind-sifting device to be recycled to the mixer.

In order to ensure good homogenization of the starting products, the apparatus should be provided with one or more additional centrifugal mixing means directly supplying sodium orthophosphate/orthophosphoric acid and/or magnesium/calcium oxide-mixtures to the mixer.

Very good results are obtained when the mixer is a double shaft mixer, i.e. especially when the mixer paddles are partially set to counter-transport position, when weirs accumulating flowing material are provided, and when pendulum crushing rollers are used to achieve mill-drying.

The composition of the salt mixture prepared in accordance with the present invention may vary approximately within the following limits:

| | Percent |
|---|---|
| $P_2O_5$ | 35–50 |
| $Na_2O$ | 10–20 |
| MgO | 4–22 |
| CaO | 0–18 |
| $H_2O/800°$ C. | 6–23 |
| $P_2O_5$, citrate soluble | 95–100 |
| $P_2O_5$, water soluble | 55–65 |

The $Na_2O$, MgO, CaO and $P_2O_5$-contents differ depending on requirements demanded of the product, in which the cationic and anionic components are so adapted to each other that an aqueous suspension of the final product has a pH-value between 6 and 8, preferably a pH-value of approximately 7.

A phosphate salt mixture of the type described above contains the sodium in the form of $Na_2HPO_4$ with and without water of crystallization (2 or 7 $H_2O$), the magnesium in the form of $MgHPO_4 \cdot 3\ H_2O$, and the calcium in the form of $CaHPO_4$ and $CaHPO_4 \cdot 2\ H_2O$.

While nature determines the ratio of CaO:MgO, e.g. 56% CaO to 38% MgO, in dolomite, it is possible to vary such ratio on preparing a calcium oxide/magnesium oxide mixture.

The use of CaO and MgO, e.g. in the ratio of 1:1, results in a salt which approximately has the following composition:

| | Percent |
|---|---|
| $P_2O_5$ | 39.0–40.5 |
| $Na_2O$ | 15.5–17.0 |
| MgO | 9–11 |
| CaO | 9–11 | provided that all other values are maintained constant.

Apart from the principal components listed in the preceding table, the phosphate mixture should contain impurities in proportions not exceeding the following maximum values:

| | Percent |
|---|---|
| $SO_3$ (as sulfate) | 2.0 |
| F | 0.1 |
| Fe | 0.5 |
| Al | 0.5 |
| Pb | 0.005 |
| As | 0.004 |

For producing salt containing less than 0.1% by weight of fluorine, it is necessary to remove the fluorine from the wet phosphoric acid generally employed as the starting material. To this end, about 10–12 kg. NaOH of 50% strength are added, per 100 kg. $P_2O_5$, to the crude phosphoric acid which contains 31% $P_2O_5$, for an initial fluorine content of 4.5%. This results in the fluorine being precipitated in known manner in the form of sodium silico-fluoride which is filtered off. The phosphoric acid so prepurified is then concentrated to contain 50% $P_2O_5$ and less than 0.1% by weight fluorine.

The concentrated phosphoric acid can be worked up by three various ways.

(1) Prepurified, i.e. defluorinated phosphoric acid is partially neutralized in a stirring vessel, while cooling, with a proportion of sodium hydroxide solution sufficient to produce a final product with a predetermined content of sodium. The resulting acid sodium phosphate solution is conveyed by means of a dosing pump to a double shaft mixer fed simultaneously with dolomite or a MgO-CaO-mixture supplied by means of a tape weigher. This promotes the reaction of the acid sodium phosphate solution with the dolomite or MgO-CaO-mixture to give a neutral composition of sodium-magnesium-calcium phosphate. A thinly liquid magma is obtained first. The exothermal reaction causes about 20–50% of the water introduced through the sodium phosphate solution to evaporate. During the salt formation, a further quantity of water is bound simultaneously in the form of water of crystallization, and the magma hardens.

In order to allow the material to remain in the shaft mixer for a period of about 10–45 minutes, which is necessary to achieve sufficient hardening, the mixer paddles are partially set to counter-transport position and weirs are provided for accumulating product. The mixer paddles subdivide the hardening magma into moist, crumbly or particulate material. The water evaporated during the reaction is removed by suction.

The preparation of the acid phosphate solution has the inherent advantage of enabling the $P_2O_5$ to $Na_2O$-ratio to be accurately adjusted before the reaction by analytical control, and dosing errors to be avoided. However, a relatively moist final product difficult to work up is obtained unless on concentrating the prepurified acid the $P_2O_5$-concentration is appropriately increased to about 50–55%.

For improved homogenization of the reaction mixture, the shaft mixer should be series-connected to a so-called centrifugal mixer placed in front of the shaft mixer. The centrifugal mixer converts the solution and solid matter into a completely homogeneous magma free of lumps, which is conveyed to the shaft mixer to ripen further.

The moist product which besides a desirable total water (800° C.) content of 20% also includes 20–25% water of adhesion is caused to travel through the double shaft mixer and dried subsequently. Drying can be brought about either by means of a rotary tube series-connected to a means for grinding the final product or more conveniently in a combined operation by mill-drying.

Drying in a rotary tube has the disadvantage that the moist product varying in grain size obtained in the shaft mixer results in different sojourn times for the rotary tube. The sojourn time is the shorter the coarser the grains, and it is the longer the finer the grains. In order thoroughly to dry coarse grains despite their short sojourn time, it is necessary to use drying temperatures considerably higher than those used for drying fine grains. This means that water of adhesion plus a portion of desired water of crystallization are expelled from the fine-grained matter; in other words, drying is heterogeneous and homogenization occurs only upon grinding.

Mill-drying, however, ensures more uniform drying under milder conditions and is therefore preferred to the drying in a rotary tube. As a mill, preferably pendulum crushing rollers, merely admits of working up product containing 8–15% water of adhesion, it necessary, per 100 kg. moist product, to remove about 150–300 kg. oversize grains from the granular material cycled through the mill, and to recycle the material removed to the shaft mixer so as to reduce the total water content of the friable or particulate green product down to a value of 25% at the discharge end of the shaft mixer.

(2) The phosphoric acid and the dolomite or the CaO-MgO-mixture are introduced by means of a dosing pump and a tape weigher into the centrifugal mixer. The magma leaving the contrifugal mixer is admixed in the shaft mixer with a determined proportion of sodium hydroxide solution supplied by means of a further dosing pump. This operation entails the advantage that the entire heat of neutralization can be used for evaporating the water of adhesion in the shaft mixer, as opposed to the preparation of the acid sodium phosphate solution by the procedure described under paragraph 2 above, wherein the partial neutralization of the phosphoric acid while cooling means premature dissipation of such heat.

(3) As shown in the attached flow diagram, a double shaft mixer 7 is directly fed by means of a dosing pump 2 with pre-purified and concentrated phosphoric acid coming from a container 1, by means of a dosing pump 4 with sodium hydroxide solution coming from a container 3, and by means of a tape weigher 6 with dolomite or an appropriate CaO-MgO-mixture coming from a container 5.

On being combined in the double shaft mixer the components again form with $H_3PO_4$ and dolomite a homogenous magma into which the sodium hydroxide solution is introduced then. This procedure again enables the entire heat neutralization to be utilized for evaporating the water of adhesion.

The amounts of water evaporated during the reaction are removed by means of a discharge line 8.

The moist product obtained is dried further in the manner described under 1 supra.

To this end, product leaving the double shaft mixer is hot air-dried and ground concurrently therewith in pendulum crushing rollers 9, the hot air being supplied through line 10.

Ground material discharged by the current of hot air from the pendulum crushing rollers is separated in a sifter 11 into final product and coarse grains, the latter being recycled to the double shaft mixer and/or the pendulum crushing rollers.

The final product obtained is ultimately conveyed through a cyclone 12 and a filter 13 to a storage tank 14.

Example 1

A centrifugal mixer was charged in continuous operation, per minute, with about 13 kg. (=780 kg./hr.) of an acid sodium phosphate solution containing 31.3% $P_2O_5$ and 12.6% $Na_2O$, and with about 2.24 kg. (=134.4 kg./hr.) of a CaO-MgO-mixture containing about 45.5% MgO and 45.5% CaO. The reaction gave 914 kg/hr. of a pulpy reaction product which was treated in a double shaft mixer to expel the water and then dried to yield about 620 kg. of final product. The same quantities of sodium phosphate solution and CaO-MgO-mixture can be introduced directly into the double shaft mixer while omitting the centrifugal mixer.

Analysis:

| | | |
|---|---|---|
| Total $P_2O_5$ | percent | 39.6 |
| $Na_2O$ | do | 15.9 |
| MgO | do | 10.3 |
| CaO | do | 9.8 |
| $H_2O$, 800° C. | do | 22.0 |
| $P_2O_5$, citrate-soluble | do | 96 |
| $P_2O_5$, water-soluble | do | 64 |
| pH-value | | 7.2 |

Example 2

The centrifugal mixer was charged in continuous operation, per minute, with about 8 kg. (=480 kg./hr.) of prepurified, concentrated wet phosphoric acid containing 50% $P_2O_5$ and, per minute, with about 2.2 kg. (=132 kg./hr.) of a CaO-MgO-mixture containing about 45.5% MgO and 45.5% CaO. The magma leaving the centrifugal mixer was admixed in the double shaft mixer, per minute, with 4.12 kg. (=248 kg./hr) of a 50% sodium hydroxide solution. The magma (860 kg./hr.) was freed from water, allowed to harden and to ripen, and dried, and 590 kg. of final product were obtained.

Analysis:

| | | |
|---|---|---|
| Total $P_2O_5$ | percent | 40.6 |
| $Na_2O$ | do | 15.6 |
| CaO | do | 10.6 |
| MgO | do | 11.0 |
| $H_2O$, 800° C. | do | 18.8 |
| $P_2O_5$, citrate-soluble | do | 98 |
| $P_2O_5$, water-soluble | do | 56 |
| pH-value | | 7.3 |

Example 3

All of the three components including prepurified, concentrated phosphoric acid, dolomite and sodium hydroxide solution, were introduced in continuous operation and preferably in the order of succession indicated into the double shaft mixer, i.e. in the following proportions:

About 8 kg./min. (=480 kg./hr.) phosphoric acid containing 50% $P_2O_5$; about 2.1 kg. (=127 kg./hr.) ground, calcined dolomite containing 55% CaO and 38.3% MgO; and 4.12 kg. (=248 kg./hr.) NaOH of 50% strength.

The 855 kg./hr. of magma obtained gave about 580 kg. of final product.

Analysis:

| | | |
|---|---|---|
| $Na_2O$ | percent | 16.3 |
| MgO | do | 8.1 |
| CaO | do | 11.2 |
| $H_2O$, 800° C. | do | 20.5 |
| $P_2O_5$, citrate-soluble | do | 99 |
| $P_2O_5$, water-soluble | do | 61 |
| pH-value | do | 7.0 |

We claim:

1. A process for the manufacture of a salt mixture having a composition suitable as an animal feed additive and formed of sodium and magnesium orthophosphates comprising reacting with continuous agitation by mixing for a period of from 10 to 45 minutes at least one member selected from the group consisting of (1) a mixture of orthophosphoric acid and a sodium hydroxide or sodium carbonate solution, (2) a sodium phosphate solution and (3) a mixture of sodium orthophosphate and orthophosphoric acid with magnesium oxide, the orthophosphoric acid containing 45–60% by weight $P_2O_5$ and the magnesium oxide having a grain size smaller than 0.5 mm., evaporating the majority of water from the reaction mixture by heat of neutralization evolved during the reaction and drying the resulting salt mixture to remove the remaining water.

2. A process as claimed in claim 18, wherein the magnesium oxide is used in admixture with calcium oxide having a grain size smaller than 0.5 mm. with the resultant formation of a salt mixture which also contains calcium orthophosphates.

3. A process as claimed in claim 2, wherein the magnesium oxide and calcium oxide, respectively, are used in a grain size smaller than 0.1 mm.

4. A process as claimed in claim 1, wherein the orthophosphoric acid contains about 50–55% by weight $P_2O_5$.

5. A process as claimed in claim 1, wherein the reaction is carried out at a temperature between 80 and 120° C.

6. A process as claimed in claim 5, wherein the reaction is carried out at a temperature of about 100° C.

7. A process as claimed in claim 1, wherein the salt mixture is dried and comminuted concurrently therewith.

8. A process as claimed in claim 1, wherein the salt mixture is freed from residual water of adhesion by mill-drying.

9. A process as claimed in claim 8, wherein the salt mixture having a total water content of about 35% by weight is admixed with a proportion of recycled material coming from the mill-drying stage sufficient to reduce the total water content of the salt mixture down to a value of about 25% by weight before mill-drying the said mixture.

10. A process as claimed in claim 18, wherein the starting product is calcined dolomite.

11. A process as claimed in claim 10, wherein the starting product is annealed dolomite.

12. A process as claimed in claim 1, wherein the starting product is orthophosphoric acid partially neutralized with at least one member selected from the group consisting of sodium hydroxide solution and sodium carbonate.

13. A process as claimed in claim 12, wherein a sodium orthophosphate/orthophosphoric acid-mixture containing 33–43% by weight $P_2O_5$ and containing $Na_2O$ and $P_2O_5$ in a ratio of 1:2 to 1:3 is used.

14. A process as claimed in claim 13, wherein the mixture contains 36–40% by weight $P_2O_5$.

15. A process as claimed in claim 13, wherein the mixture contains $Na_2O$ and $P_2O_5$ in a ratio of 1:2.5.

16. A process as claimed in claim 1, wherein the starting products while being mixed are caused to travel through a mixing range.

17. A process as claimed in claim 16, wherein the starting products are fed concurrently to said mixing range, liquid starting products being fed near the opening portion of said range and solid starting products being fed at a place immediately thereafter.

18. The process according to claim 1 wherein the salt mixture contains calcium orthophosphate and the magnesium oxide is employed as at least one member selected from the group consisting of (1) a mixture of magnesium oxide and calcium oxide having a grain size smaller than 0.5 mm., (2) a mixture of magnesium hydroxide and calcium hydroxide and (3) calcined dolomite.

References Cited

UNITED STATES PATENTS 2,137,674  11/1938  MacIntire _____ 23—109

FOREIGN PATENTS 492,243  1930  Germany.

OSCAR R. VERTIZ, *Primary Examiner.*

L. A. MARSH, *Assistant Examiner.*